(12) United States Patent
Yilma et al.

(10) Patent No.: US 10,189,436 B2
(45) Date of Patent: Jan. 29, 2019

(54) ERGONOMIC SAFETY BELT LATCH PLATE

(71) Applicant: FORD GLOBAL TECHNOLOGIES, LLC, Dearborn, MI (US)

(72) Inventors: Benjamin Yilma, Canton, MI (US); Travis Justin Raines, Grosse Ile, MI (US); Edwin C. Chiu, Livonia, MI (US); Christopher Donald Schop, Chelsea, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 288 days.

(21) Appl. No.: 15/229,605

(22) Filed: Aug. 5, 2016

(65) Prior Publication Data
US 2018/0037189 A1    Feb. 8, 2018

(51) Int. Cl.
*B60R 22/18*    (2006.01)

(52) U.S. Cl.
CPC ...... *B60R 22/18* (2013.01); *B60R 2022/1812* (2013.01); *B60R 2022/1818* (2013.01)

(58) Field of Classification Search
CPC .............................. A44B 11/25; A44B 11/2553
See application file for complete search history.

(56) References Cited

U.S. PATENT DOCUMENTS

| | | | | |
|---|---|---|---|---|
| 4,871,190 A * | 10/1989 | Willey | ............... | B60R 22/30 24/196 |
| 4,878,272 A * | 11/1989 | Kotikovsky | ....... | A44B 11/2557 24/171 |
| 4,935,994 A * | 6/1990 | Boone | ............... | A44B 11/2557 24/171 |
| 4,962,572 A * | 10/1990 | Prentkowski | ...... | A44B 11/2557 24/196 |
| 5,222,278 A * | 6/1993 | Ball | ............... | A44B 11/2553 24/170 |
| 5,870,816 A * | 2/1999 | McFalls | ............ | A44B 11/2553 24/170 |
| 6,340,173 B1 * | 1/2002 | Specht | ............... | B60R 21/18 280/733 |

(Continued)

FOREIGN PATENT DOCUMENTS

| | | | | |
|---|---|---|---|---|
| DE | 202006004472 U1 | 5/2006 | | |
| DE | 102014115263 A1 * | 4/2016 | ............ | B60R 22/18 |

(Continued)

OTHER PUBLICATIONS

English Machine Translation of DE202006004472U1.
English Machine Translation of EP1747954B1.

*Primary Examiner* — Nicole T Verley
(74) *Attorney, Agent, or Firm* — Vichit Chea; King & Schickli PLLC

(57) ABSTRACT

A latch plate for a vehicle safety belt includes a latch plate tongue element and a grip element. The grip element includes a gripping portion that is held on a plane that is offset from a plane defined by the latch plate tongue element. The gripping portion plane may be parallel to the plane defined by the latch plate tongue element. The gripping portion may be held at a plane defining an included angle to a plane defined by an associated safety belt webbing element when the latch plate tongue element is secured to a safety belt buckle element.

17 Claims, 4 Drawing Sheets

(56) References Cited

U.S. PATENT DOCUMENTS

| | | | |
|---|---|---|---|
| 7,503,587 B2 | 3/2009 | Corcoran | |
| 8,661,625 B2 | 3/2014 | Carene et al. | |
| 8,905,438 B2 * | 12/2014 | Ohmura | A44B 11/2561 24/588.11 |
| 2006/0090312 A1 | 5/2006 | Ichida et al. | |
| 2007/0039144 A1 * | 2/2007 | Ichida | A44B 11/2561 24/633 |
| 2009/0295138 A1 | 12/2009 | Cox et al. | |
| 2016/0000190 A1 * | 1/2016 | Knoedl | A44B 11/2557 24/171 |

FOREIGN PATENT DOCUMENTS

| | | | | |
|---|---|---|---|---|
| EP | 1747954 B1 | | 12/2007 | |
| JP | 05112199 A | * | 5/1993 | B60R 21/18 |
| JP | 05211908 A | * | 8/1993 | A44B 11/2553 |
| JP | WO 2013099590 A1 | * | 7/2013 | B60R 22/18 |
| WO | WO 2015172879 A1 | * | 11/2015 | A44B 11/2553 |

\* cited by examiner

ERGONOMIC SAFETY BELT LATCH PLATE

TECHNICAL FIELD

This disclosure relates generally to vehicle safety belts. More particularly, the disclosure relates to an ergonomically improved safety belt latch plate.

BACKGROUND

The conventional vehicle seat belt or safety belt assembly includes safety belt webbing, a buckle assembly including a release button, and a latch plate which is captured by the buckle assembly to secure the safety belt webbing around a vehicle passenger. The latch plate is typically slidably associated with the safety belt webbing to allow adjusting a length of the webbing that is secured around a vehicle occupant. The user simply inserts the latch plate into the buckle to secure the safety belt, and presses the buckle release button to release same.

This basic design has been utilized by vehicle manufacturers for decades, but suffers from certain deficiencies. For example, the conventional latch plate (also referred to as a tongue) is a thin structure which may be difficult to secure to and/or release from a buckle assembly, particularly for individuals with limited or impaired dexterity. Accordingly, a need in the art is identified for alternative safety belt latch plates or tongues.

The present disclosure relates to an ergonomic safety belt latch plate. Advantageously, the disclosed ergonomic safety belt latch plate includes an ergonomic grip portion, improving user convenience in holding the latch plate. The ergonomic safety belt latch plate is configured whereby the ergonomic grip portion does not contact a safety belt webbing when the latch plate is buckled to a buckle assembly, but which lays flat against the safety belt webbing when the safety belt is in the retracted or stowed position.

SUMMARY

In accordance with the purposes and benefits described herein, in one aspect a latch plate for a vehicle safety belt is described, comprising a latch plate tongue element and a grip element comprising a gripping portion that is held on a plane that is offset from a plane defined by the latch plate tongue element. The gripping portion plane may be parallel to the plane defined by the latch plate tongue element. The grip element may further be configured whereby the gripping portion is held at a plane defining an included angle to a plane defined by an associated safety belt webbing element when the latch plate tongue element is secured to a safety belt buckle element.

In embodiments, the grip element comprises a first safety belt webbing guide slot and a second safety belt webbing guide slot. In embodiments, the second safety belt webbing guide slot defines an internal area that is greater than an internal area defined by the first safety belt webbing guide slot.

In other aspects, vehicle safety belt assemblies including the above-described latch plate, and vehicles including such assemblies, are described.

In the following description, there are shown and described embodiments of the disclosed ergonomic safety belt latch plate. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed ergonomic safety belt latch plate, and together with the description serve to explain certain principles thereof. In the drawing.

Figure 1C:
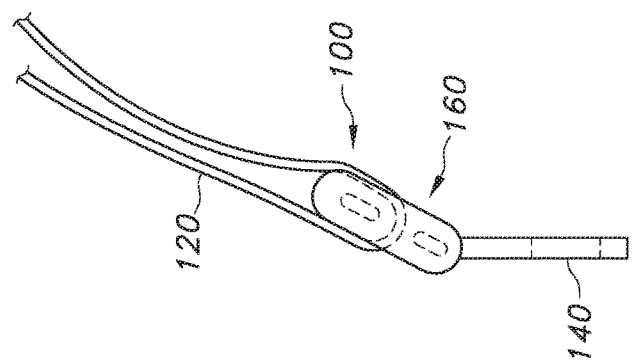
FIG. 1C is a side view of the safety belt latch plate of FIG. 1A, with the safety belt in a deployed position.
Figure 1B:
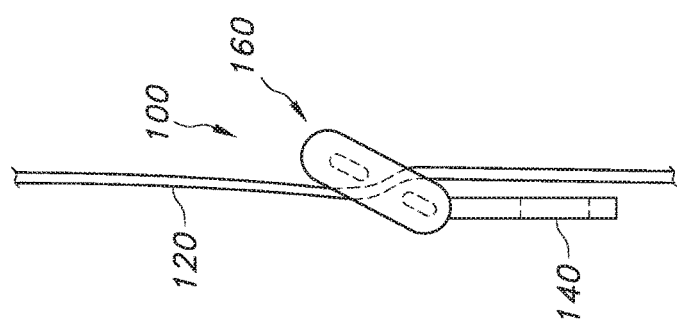
FIG. 1B is a side view of the safety belt latch plate of FIG. 1A, with the safety belt in a stowed position.
Figure 1A:
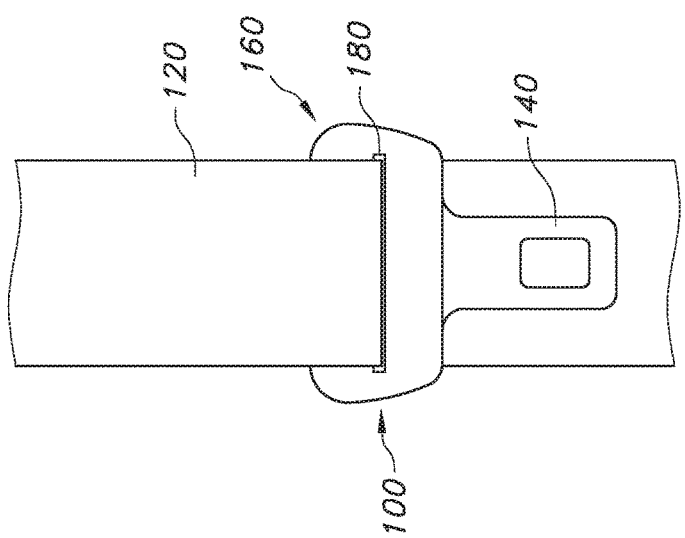
FIG. 1A is a top plan view of a prior art safety belt latch plate.
Figure 2C:
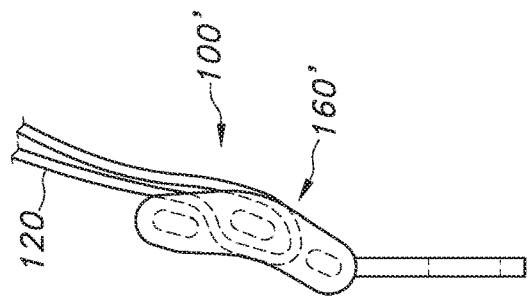
FIG. 2C is a side view of the safety belt latch plate of FIG. 2A, with the safety belt in a deployed position.
Figure 2B:
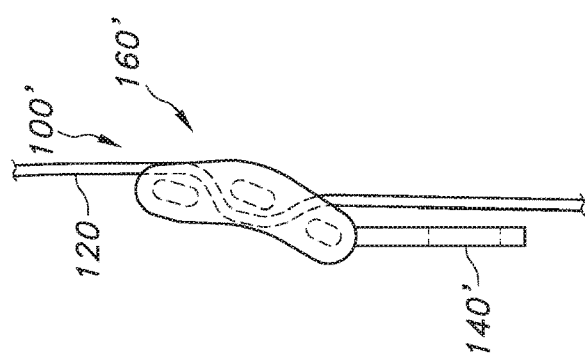
FIG. 2B is a side view of the safety belt latch plate of FIG. 2A, with the safety belt in a stowed position.
Figure 2A:
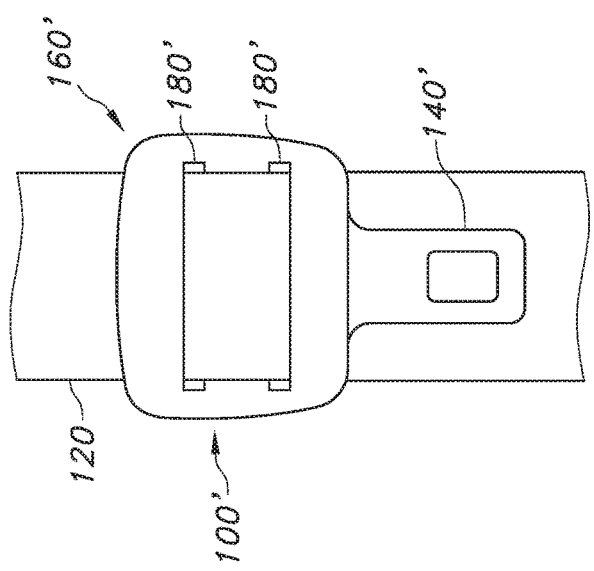
FIG. 2A is a top plan view of an alternative embodiment of a prior art safety belt latch plate.

Reference will now be made in detail to embodiments of the disclosed ergonomic safety belt latch plate, examples of which are illustrated in the accompanying drawing figures.

DETAILED DESCRIPTION

With reference to FIGS. 1A-1C and 2A-2C, prior art latch plates 100, 100' are shown slidingly connected to a safety belt webbing 120. Each latch plate 100, 100' is defined by a latch plate tongue 140, 140' and a gripping portion 160, 160'. Each embodiment includes at least one slot for slidingly receiving the safety belt webbing 120 therethrough, thus providing a sliding connection between the webbing and the latch plate 100, 100'. In the depicted embodiments, latch plate 100 includes a single safety belt webbing slot 180, whereas latch plate 100' includes dual safety belt webbing slots 180'.

As is shown in FIGS. 1B-1C and 2B-2C, whether the safety belt webbing is stowed (FIGS. 1B and 2B) or deployed and latched to a safety belt buckle (not shown) to restrain a vehicle occupant (FIGS. 1C and 2C), the gripping portion 160, 160' is held at an orientation at least substantially flush with (FIGS. 2A-2C) and even overlain by (FIGS. 1A-1C) the safety belt webbing 120. As will be appreciated, this reduces the ease and/or convenience of access to the gripping portion 160, 160', particularly for users with impaired manual dexterity.

Figure 3C:
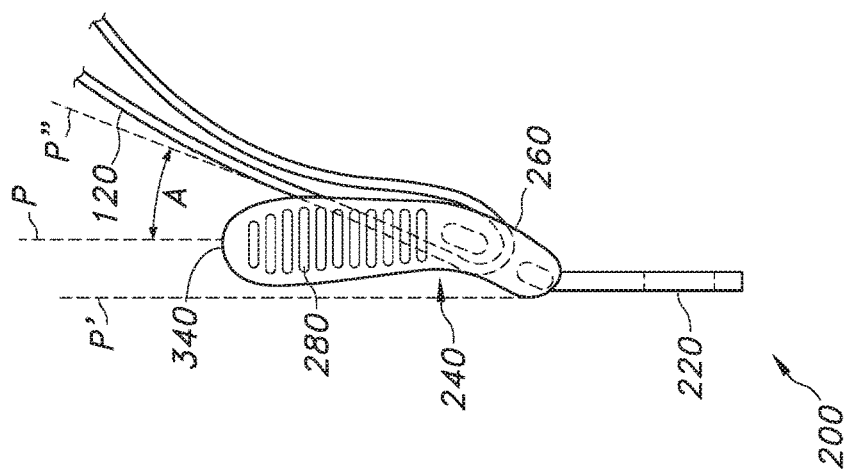
FIG. 3C is a side view of the safety belt latch plate of FIG. 3A, with the safety belt in a deployed position.
Figure 3B:
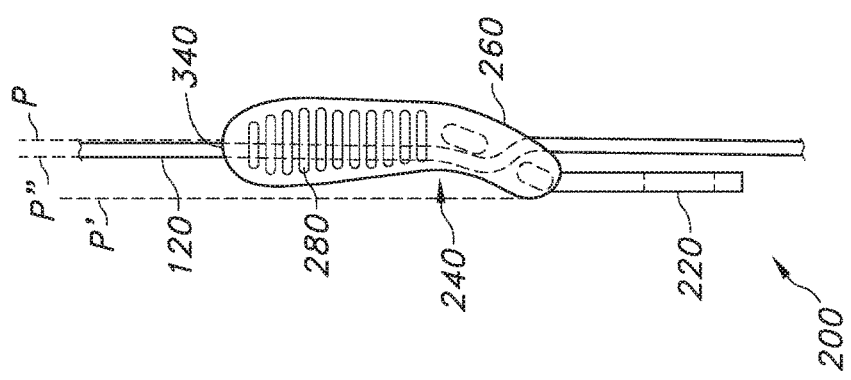
FIG. 3B is a side view of the safety belt latch plate of FIG. 3A, with the safety belt in a stowed position.
Figure 3A:
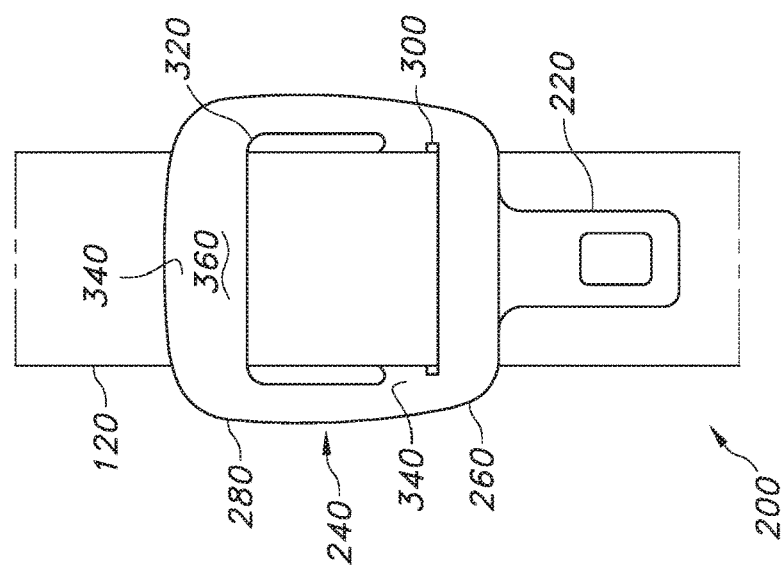
FIG. 3A is a top plan view of a safety belt latch plate according to the present disclosure.

To solve this and other problems, with reference to FIGS. 3A-3C an ergonomic safety belt latch plate 200 is provided. The latch plate 200 includes a substantially conventional tongue element 220. The latch plate 200 also includes a grip element 240 having a tongue-securing portion 260 and a gripping portion 280. Desirably, the grip element 240 will be manufactured of any suitably resilient and/or compressible material providing a comfortable, ergonomic, and secure grip. A number of suitable elastomeric materials are contemplated, including without intending any limitation suitably resilient/compressible rubbers, plastics, polymers, and combinations.

The grip element 240 includes a first safety belt webbing slot 300 and a second safety belt webbing slot 320 (see FIG. 3A) bounded by cross-members 340, 360. As shown, the second slot 320 defines an internal area that is greater than that of the first slot 300. As is also shown (see FIGS. 3B and 3C), the gripping portion 280 is held on a plane P that is offset from a plane P' defined by the tongue element 220. As shown, plane P may be parallel to plane P'.

Figure 4:
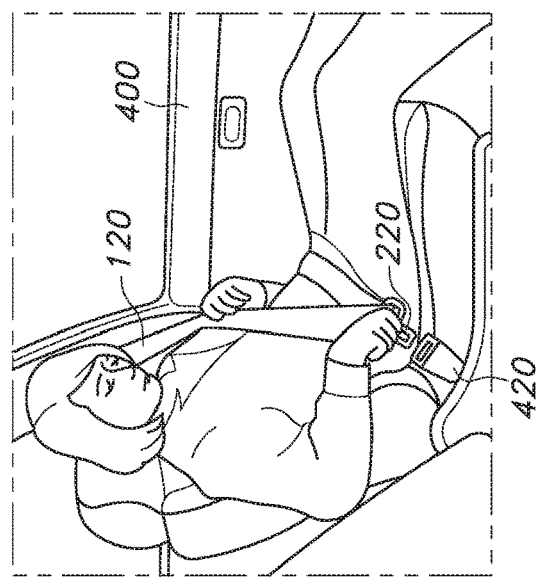
FIG. 4 shows the safety belt latch plate of FIG. 3A in use in a vehicle

In use in a vehicle 400, as shown in FIG. 4 the safety belt webbing 120 is disposed to surround and restrain a vehicle occupant O, and the latch plate tongue 220 is inserted into a safety belt buckle assembly 420. By the above-described arrangement of slots 300, 320 and the described orientations of the gripping portion 280, a particularly useful feature of the grip element 240 is provided. When the safety belt webbing is in a stowed position as shown in FIG. 3B, the gripping portion 280 is held at an orientation substantially flush with the safety belt webbing 120. As shown, the safety belt webbing 120 is held on a plane P''' that is substantially parallel with planes P, P'. In this orientation, the grip element 240 contacts the safety belt webbing 120 at two points, i.e. cross-members 340, 360.

However, because the safety belt webbing 120 passes below a top end 380 of the gripping portion 280, by the arrangement of slots 300, 320 and the configuration of the gripping portion as described above, when the safety belt webbing is deployed and latched to a safety belt buckle 420 (see FIG. 4), as shown in FIG. 3C the gripping portion 280 is oriented whereby plane P defines an included angle A relative to a plane P'' defined by the safety belt webbing. In this orientation, the grip element 240 contacts the safety belt webbing 120 at a single point, i.e. cross-member 340. As shown in the drawing, this orientation distances the gripping end 280 from the safety belt webbing 120, thus improving ease of accessing and grasping the gripping end, for example when it is desired to release the latch tongue 220 from the safety belt buckle 420.

Figure 5B:
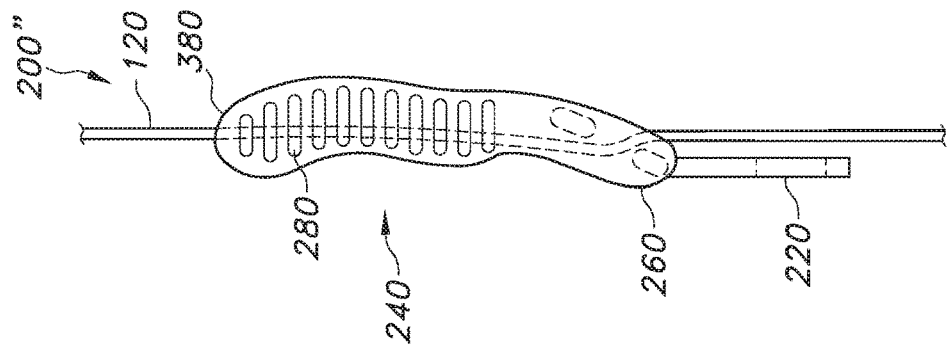
FIG. 5B shows another alternative embodiment of the safety belt latch plate of FIG. 3A.
Figure 5A:
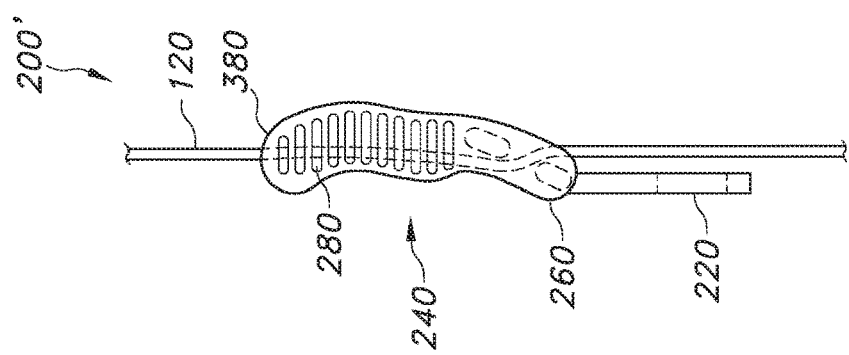
FIG. 5A shows an alternative embodiment of the safety belt latch plate of FIG. 3A.

Of course, the embodiment depicted in FIGS. 3A-3C is but one of a number of possible configurations for the described grip element 240. As non-limiting examples, FIGS. 5A and 5B depict two possible alternative embodiments of a safety belt latch plate 200', 200'' according to the present disclosure, each varying in a thickness and/or length of the gripping portion 280, in the cross-sectional configuration and dimensions of the grip element 240, etc. In turn, additional elements may be included to improve gripping security, such as knurled As will be appreciated, by the above-described ergonomic safety belt latch plate 200 configuration, an easy to grip latch plate is provided, improving user comfort and convenience during a latching/releasing procedure. In turn, by the described grip element 240 configuration, the latch plate gripping portion 280 is held in a parallel orientation to a plane defined by the safety belt webbing 120 when the webbing is in a stowed or retracted configuration, reducing contact with other vehicle components and trim. On the other hand, when the latch plate 200 is attached to a buckle assembly 420 the latch plate gripping portion 280 will have only a single point of contact with the safety belt webbing 120, and the gripping portion will be angled relative to/raised from the plane defined by the safety belt webbing when restraining a vehicle occupant, improving ease of access for unlatching at need. Thus, the gripping portion 280 does not affect the effective anchorage take off point, allowing the safety belt webbing 120 to interface to the occupant similarly to a conventional latch plate.

In turn, the described ergonomic safety belt latch plate 200 provides convenience in manufacturing. It may be fabricated by any suitable process, including without intending any limitation as part of an injection molding stamping over mold. Alternatively, it is contemplated to provide the ergonomic safety belt latch plate 200 by addition to a latch plate over mold, such as via a twin shot injection molding process combining two or more plastics/polymers into a single molded part. This process allows the over molded part of the grip portion 240 to remain ridged to the latch plate metal stamping, while allowing the remainder of the grip portion to be provided as a soft, flexible gripping surface enabling a safe, comfortable, and superior handling or gripping experience. Still more, the grip portion 240 may be added to the latch plate tongue element 220 as a secondary component. Each of these processes is readily integrated into a vehicle manufacturing process/plant, and each is contemplated for use herein.

Obvious modifications and variations are possible in light of the above teachings. All such modifications and variations are within the scope of the appended claims when interpreted in accordance with the breadth to which they are fairly, legally and equitably entitled.

What is claimed:

1. A latch plate for a vehicle safety belt, comprising:
   a latch plate tongue element; and
   a grip element comprising a gripping portion that is held on a plane that is offset from a plane defined by the latch plate tongue element;
   wherein the grip element is configured whereby the gripping portion is held at a plane defining an included angle to a plane defined by an associated safety belt webbing element when the latch plate tongue element is secured to a safety belt buckle element.

2. The latch plate of claim 1, wherein the gripping portion plane is parallel to the plane defined by the latch plate tongue element.

3. The latch plate of claim 1, wherein the grip element comprises a first safety belt webbing guide slot and a second safety belt webbing guide slot.

4. The latch plate of claim 3, wherein the second safety belt webbing guide slot defines an internal area that is greater than an internal area defined by the first safety belt webbing guide slot.

5. A vehicle safety belt assembly including the latch plate of claim 1.

6. A vehicle including the vehicle safety belt assembly of claim 5.

7. A vehicle safety belt assembly, comprising:
   a safety belt webbing element;
   a safety belt buckle element; and
   a latch plate slidingly associated with the safety belt webbing element and comprising:
   a latch plate tongue element; and
   a grip element comprising a grip element comprising a gripping portion that is held on a plane that is offset from a plane defined by the latch plate tongue element;
   wherein the grip element is configured whereby the gripping portion is held at a plane defining an included angle to a plane defined by an associated safety belt webbing element when the latch plate tongue element is secured to a safety belt buckle element.

8. The vehicle safety belt assembly of claim 7, wherein the gripping portion plane is parallel to the plane defined by the latch plate tongue element.

9. The vehicle safety belt assembly of claim 7, wherein the grip element comprises a first safety belt webbing guide slot and a second safety belt webbing guide slot.

10. The vehicle safety belt assembly of claim 9, wherein the second safety belt webbing guide slot defines an internal area that is greater than an internal area defined by the first safety belt webbing guide slot.

11. A vehicle including the vehicle safety belt assembly of claim 7.

12. A latch plate for a vehicle safety belt, comprising:
a latch plate tongue element; and
a grip element having a body defining a first safety belt webbing guide slot and a second safety belt webbing guide slot, the portion of the body defining the second safety belt webbing slot providing a grip element comprising a gripping portion that is held on a plane that is offset from a plane defined by the latch plate tongue element;
wherein the grip element is configured whereby the gripping portion is held at a plane defining an included angle to a plane defined by an associated safety belt webbing element when the latch plate tongue element is secured to a safety belt buckle element.

13. The latch plate of claim 12, wherein the gripping portion plane is parallel to the plane defined by the latch plate tongue element.

14. The latch plate of claim 12, wherein the grip element comprises a first safety belt webbing guide slot and a second safety belt webbing guide slot.

15. The latch plate of claim 12, wherein the second safety belt webbing guide slot defines an internal area that is greater than an internal area defined by the first safety belt webbing guide slot.

16. A vehicle safety belt assembly including the latch plate of claim 12.

17. A vehicle including the vehicle safety belt assembly of claim 16.

* * * * *